Sept. 11, 1951    F. M. GOYAN ET AL    2,567,882
GRAPHICAL CALCULATOR

Filed Sept. 30, 1948    3 Sheets-Sheet 1

INVENTORS
FRANK M. GOYAN
JEAN DUFRENOY
BY
Mellin and Hansen
ATTORNEYS

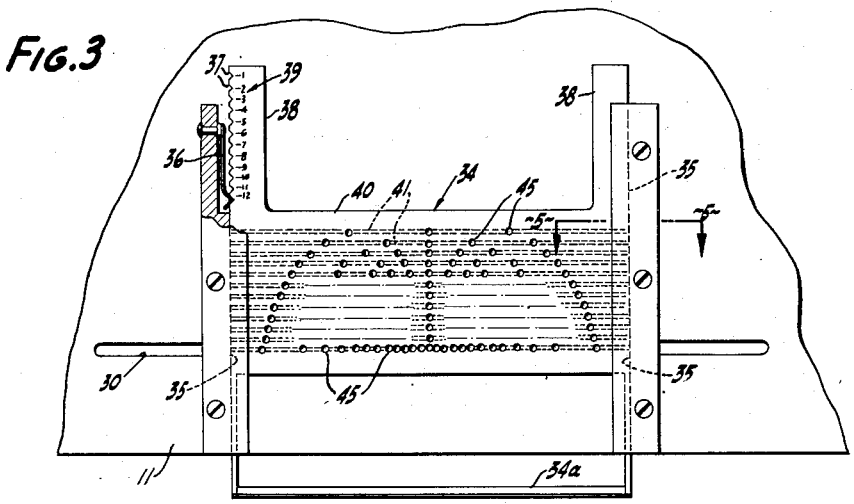
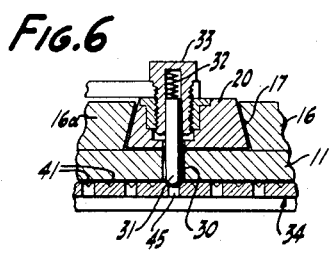
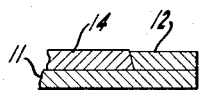
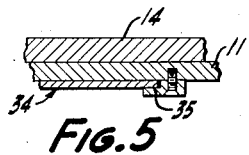
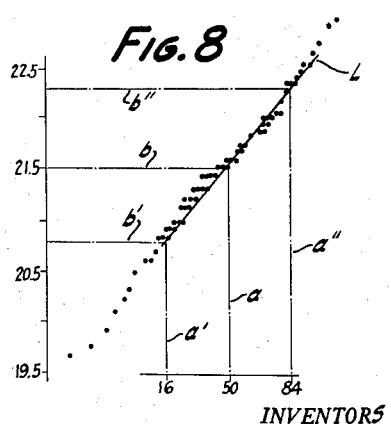

Sept. 11, 1951     F. M. GOYAN ET AL     2,567,882
GRAPHICAL CALCULATOR

Filed Sept. 30, 1948     3 Sheets-Sheet 3

INVENTORS
FRANK M. GOYAN
JEAN DUFRENOY
BY

*Mellin and Hanscom*
ATTORNEYS

Patented Sept. 11, 1951

2,567,882

UNITED STATES PATENT OFFICE 2,567,882

GRAPHICAL CALCULATOR

Frank M. Goyan, San Francisco, and
Jean Dufrenoy, Berkeley, Calif.

Application September 30, 1948, Serial No. 51,903

5 Claims. (Cl. 235—61)

This invention relates to a calculating device, and more particularly to a calculating device adapted to expedite bioassays and statistical analyses of biological and other data.

In making bioassays, such for example as penicillin assays, by the standard cup-plate method wherein the zone size in millimeters is plotted against the concentration of penicillin in Oxford units per cc. (u./cc.), it is frequently desirable to provide a mechanical device for expediting plotting data to provide a reference curve, and for utilizing the reference curve to determine unknown values from time to time.

It is also desirable, in carrying out statistical analyses of biological and other data, to provide mechanical means for plotting the data and for analyzing it to determine whether normal distribution occurs.

Thus, it may be required to plot a reference curve from a table of data equating penicillin concentration to zone inhibition, and thereafter to use the reference curve to compute the concentration of a solution from the observed zone inhibition. Since the standard solution used in measuring zone inhibition varies from day to day, a reading cannot be taken directly from the reference curve.

In statistical analysis, it may, for example, be required to determine whether observed zone inhibitions of a penicillin solution of unit concentration, have a normal distribution. In such case, the observed values, or functions thereof such as the logarithms, will be arranged in order of ascending or descending magnitude and plotted on probability paper calculated to give a straight line as the best fitting curve, and to give a standard deviation near the extremes from the mean value. Should the plot fail to fit a straight line, or to provide the standard deviations, then another function of the observed values may be used, or investigation may be directed to other channels for an explanation.

In these and other instances, it is desirable to provide a mechanical aid which expedites the initial plotting of observed data and analysis thereof.

It is an object of the present invention to provide a device of the character described which is adapted to plot and/or analyze biochemical data and the like.

It is a further object of the invention to provide a graphical calculator for bioassays and the like, which is operable to plot a reference curve and to rapidly determine from the reference curve an unknown value.

It is a still further object of the invention to provide a graphical calculator for statistical analysis which is adapted to rapid plotting of statistical data to determine whether the same have a normal distribution, and to analysis thereof to determine standard deviations, etc.

These and other objects of the invention will be apparent from the ensuing description and the appended claims.

Certain forms which the invention may assume are exemplified in the following description and illustrated by way of example in the accompanying drawings, in which:

Fig. 3 is a fragmentary bottom view showing the locating member or template.

Fig. 4 is a section taken along the line 4—4 of Fig. 1.

Fig. 5 is a section taken along the line 5—5 of Fig. 3.

Fig. 6 is a section taken along the line 6—6 of Fig. 1.

Fig. 7 is a diagrammatic view showing the use of the device of Fig. 1 in bioassay work.

Fig. 8 is a graph illustrating the use of the device in statistical analysis.

Figure 1:
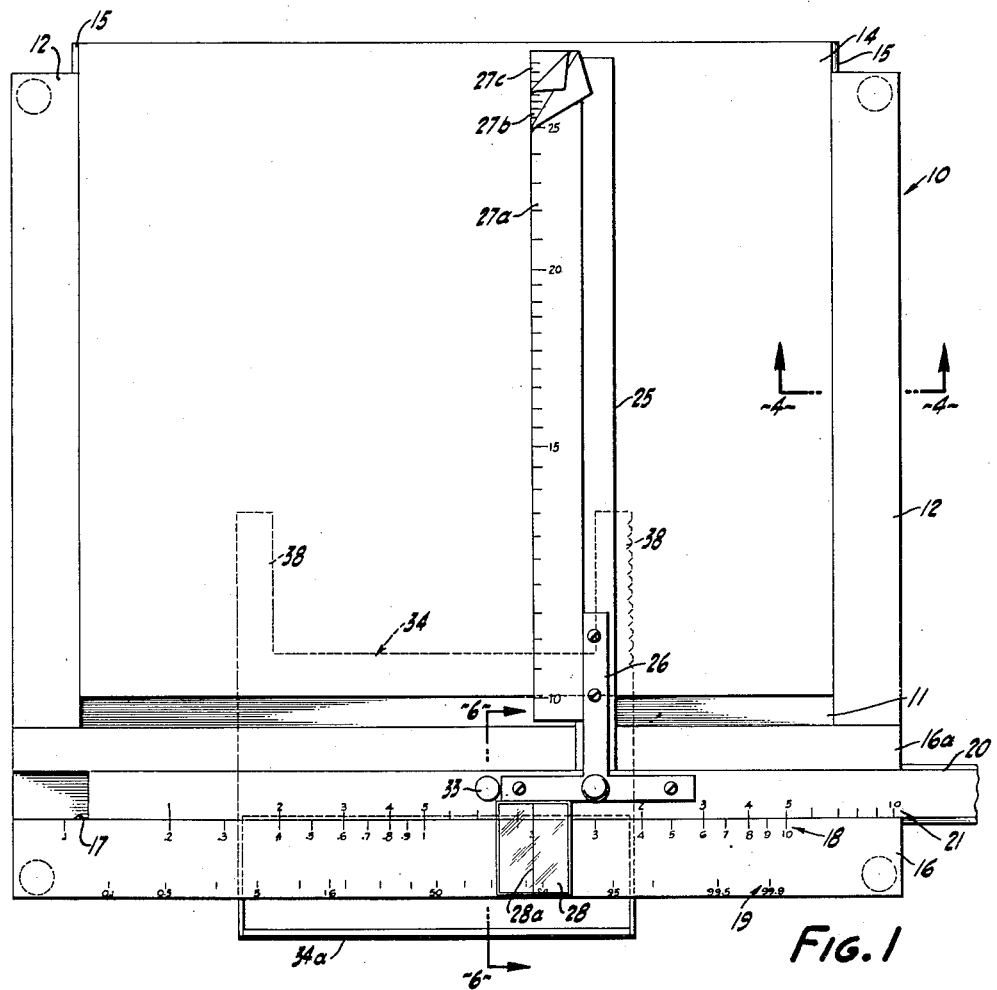
Fig. 1 is a plan view of one form of graphical calculator of the invention.
Figure 2:
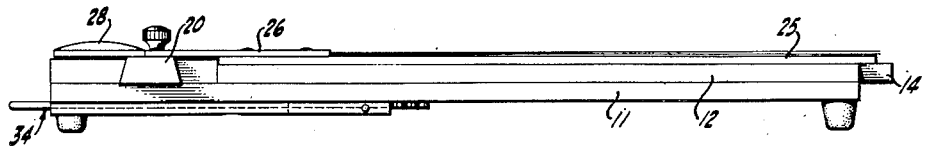
Fig. 2 is an end elevation of the same as viewed from the left of Fig. 1.

Referring now to the drawings, and more particularly to Figs. 1 to 6, the graphical calculator is indicated generally as 10, and it comprises a flat body portion or board 11 having secured thereto along its edges beveled side members 12. A sliding panel 14 having complemental beveled edges 15 is provided, such panel being flat and being slidably disposed between the side members 12 of the board. Beveled cross members 16 and 16a are also provided, being spaced apart to provide a groove 17. A log scale 18 and a probability scale 19 are affixed to the lower cross member 16, as by imprinting the scales directly upon the member 16, or upon strips of paper and pasting the same to the cross member 16. A sliding member 20 is slidably disposed in the groove 17 and a two-cycle log scale 21 is affixed thereto as described with reference to the scales 18 and 19.

A vertical member 25 is provided which is secured to the sliding member 20 by a T piece 26, and a plurality of scales 27a, 27b and 27c are secured to the vertical member 25 by any suitable means; e. g., the scales 27a, 27b and 27c may be imprinted upon strips of paper, which are then pasted to the vertical member 25. A cursor 28 is also provided, being secured to the slide member 20 and having a hair line 28a formed thereon scanning the scales 18 and 19.

As shown in Figs. 3 and 6, the beveled groove 17 is provided with a longitudinal slot 30, and a pin 31 secured to the slide member 20 is resiliently urged downwardly through the slot 30 by a coil spring 32 adjustable by a nut 33. A locating member or template 34, best shown in Fig. 3, is secured to the undersurface of the board 11. The template 34 is provided with a handle 34a, and it is slidable in keyways 35 and is adjustable longitudinally of the board 11 by means of a spring 36 engaging notches 37 formed in one of a pair of arms 38 integral with the locating member 34. It will thus be apparent that the template 34 is easily placed in any selected position by selection of a notch 37, and as illustrated a scale 39 may be provided to facilitate this selection.

The template 34 is preferably a metal plate, and its body portion 40 is grooved longitudinally to provide grooves 41, and it is drilled to provide holes 45 which, as shown, are arranged in a symmetrical pattern, the significance of which is explained hereinafter. The notches 37 are spaced apart a distance equal to the spacing of the grooves 41, and the grooves 41 and holes 45 are so disposed that, when the spring 36 is seated in the notch 37 opposite "1" on scale 39, the topmost groove 41 and row of holes 45 is aligned with the slot 30 and pin 31, etc.

Figure 9:
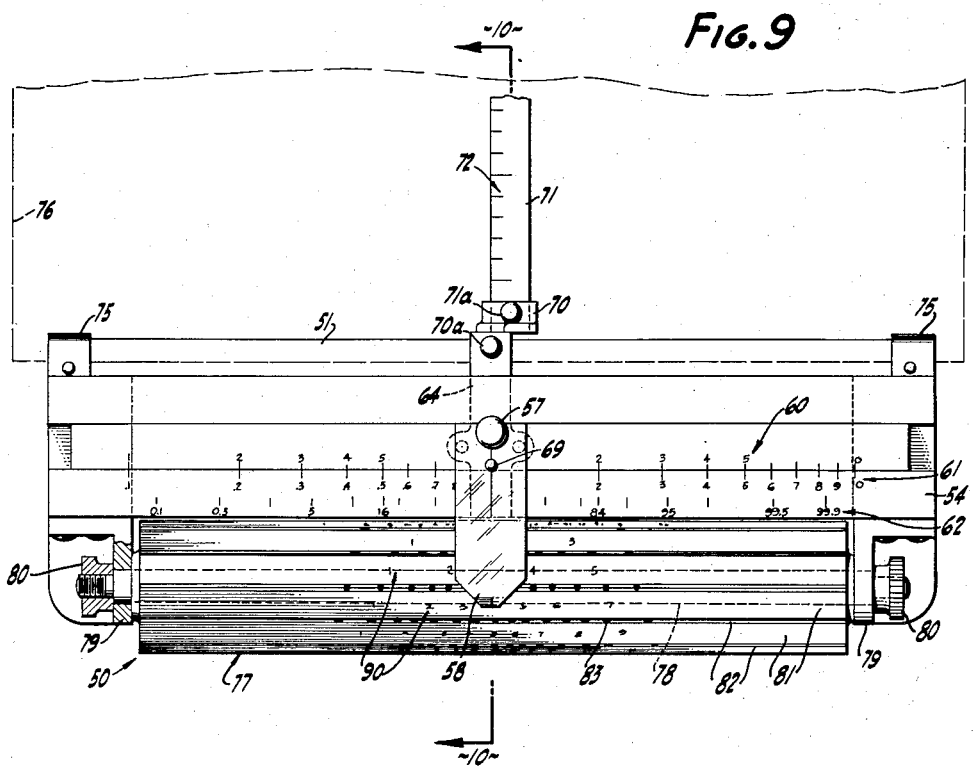
Fig. 9 is a plan view, partly in section, of an alternative and preferred embodiment which is more compact and is collapsible.
Figure 10:
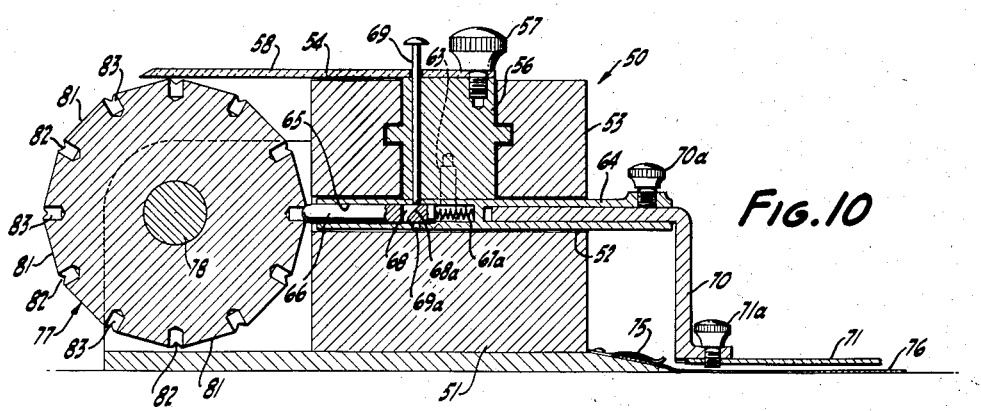
Fig. 10 is a section taken along the line 10—10 of Fig. 9.

Referring now to Figs. 9 and 10, there is shown a graphical calculator generally designated as 50, which is of more compact and more generally useful structure than that shown in Figs. 1 to 6.

The calculating device 50 comprises a base 51 having a slot 52 formed therein, as illustrated. The base 51 supports spaced, longitudinal members 53 and 54 providing a keyway 55 within which is slidably disposed a slide member 56 having an operating knob or handle 57 and a cursor 58 secured to its upper surface. The slide member 56 is provided with a two-cycle log scale 60 and the longitudinal member 54 is provided with a two-cycle log scale 61 and with a probability scale 62, the scales 60, 61, 62 being similar to the scales 21, 18 and 19, respectively of the device of Fig. 1.

Secured to the undersurface of the slide member 56 by means of a screw 63, and disposed within the slot 52, is a sleeve or hollow tube 64 having formed therein, at its rearward end, a socket 65 within which is slidably disposed a pin 66 urged outwardly by a coil spring 67a. A slot 68 is formed in and extends through the pin 66, and at the end of the slot 68 a sloping cam surface 68a is provided. A rod or pin 69 extends through the slide member 56 in alignment with the cam surface 68a, and also with a hole 69a formed in the base 51 below the cam surface 68a. It will thus be seen that the pin 66 is normally urged outwardly by the spring 67a, but that it can be retracted, for a purpose explained hereinafter, by thrusting the pin 69 downwardly against the cam surface 68a, thus moving the pin 66 inwardly. Also, it will be seen that the pin 66 can be latched in retracted position by seating the pin 69 in the hole 69a.

Slidably disposed within the forward end of the sleeve 64 is a bracket 70 secured in adjusted position by means of a set screw 70a. Secured to the outer and lower end of the bracket 70 by means of a set screw 71a is a vertical member 71 which is similar in structure and function to the vertical member 25 of Fig. 1 and to which any desired number of scales 72, similar in design and function to the scales 27a, 27b and 27c of Fig. 1, are secured by any suitable means. Clips 75 are provided at the forward edge and at opposite ends of the base 51, to secure a sheet of paper 76 for a purpose explained hereinafter.

A locating cylinder 77 is also provided, such cylinder being free on a shaft 78 journaled in brackets 79. Nuts 80 serve to clamp the cylinder 77 between brackets 79 and to apply pressure to the ends of the cylinder, thereby holding it in any desired angular position until a reasonable degree of force is applied manually to the cylinder to rotate it about its longitudinal axis. As illustrated, the cylinder 77 is of polygonal cross section so as to provide flat longitudinal segments 81, and at the intersections of the flat segments 81 the cylinder is provided with grooves 82. A pattern of holes 83 is formed in the cylinder, comprising parallel rows of holes varying from three in number to twenty-five or any larger number desired. Each row of holes is disposed in a groove 82. The pattern of holes 83 is exactly the same as the pattern of holes 45 illustrated in Fig. 3, but is disposed about the surface of the cylinder 77 instead of upon a flat plate.

The pin 66 serves as a locating member. As illustrated, it is urged into a selected groove 82 by means of the coil spring 67a, and as the slide member 56 is moved to the right or to the left, the pin 66 falls successively into the holes of any selected row. As illustrated, a scale 90 is provided along each one of the flat segments 81, and these scales are so disposed that when, for example, a row of seven holes is aligned with the pin 66, the numbers 1 to 7 will appear on the uppermost segment 81 so as to be scanned by the cursor 58, such numbers being spaced apart the same distance as and in exact alignment with the holes 83 which are in alignment with the pin 66. In this manner, the operator can readily select the desired row of holes. Having selected a row, the operator can also select any individual hole, and at all times he is enabled to determine instantly which hole seats the pin 66. It will also be noted that the pin 66, hence the selected hole 83, is in exact alignment with the left hand edge of the scale 72.

The following specific examples will illustrate the use of the calculating device described hereinabove. In each of the examples, utilization of the device of Figs. 1 to 6 will first be described and thereafter the application of the device of Figs. 9 and 10 will be described.

EXAMPLE I—BIOASSAY

A reference curve is plotted from reference data such as given in Table I below:

TABLE I

*Average results from cup-plate assays (standard oxford cup-plate method)*

| Known Concentrations of Penicillin, U./Cc. | Measured Zones, Diameters, Mm. |
|---|---|
| 0.25 | 14.80 |
| 0.50 | 18.47 |
| 0.75 | 20.43 |
| 1.00 | 21.86 |
| 1.50 | 23.59 |
| 2.00 | 24.90 |
| 3.00 | 26.50 |
| 4.00 | 27.55 |

The reference curve is shown in Fig. 7, where it is identified as R. A sheet of graph paper 46 is secured to the sliding panel 14. The template 34 is not needed; hence, the locating pin 31 is preferably removed. The reference curve is plotted thereon by moving the origin of scale 21 (i. e., the beginning of the second log cycle) successively to the values given in the first column of Table I, and at each such position placing a mark on the paper 46 under the corresponding zone diameter as shown on scale 27a. The purpose of plotting log concentrations vs. log diameters is to obtain a linear relationship.

To determine the potency of a solution under test, the scale 21 is moved until the origin is opposite the reading on scale 18 equal to the concentration of the standard solution of the day. The sliding panel 14 is then moved up or down until the reference curve is directly under the diameter of the standard solution as read on the ordinate scale 27a. Then the scale 21 is moved left or right until the reference curve is directly under the division of the scale 27a corresponding to the measured diameter of the inhibition zone for the dilution under test. Then the concentration in u./cc. is read on scale 18 opposite the proper dilution factor on scale 21.

In employing the device of Figs. 9 and 10, the device is placed upon any suitable flat surface, such as a desk or table, and a paper 76 is secured to the device by means of the clips 75. The device is then used exactly as the device of Figs. 1 to 6, but instead of moving a panel, such as the panel 14, up and down to conform the reference curve to the standard solution of the day, the set screw 70a is loosened, the bracket 70 is moved up or down until the scale 72 conforms the standard solution with the reference curve, and the set screw is tightened to hold the scale 72 in adjusted position. It is thus apparent that a bulky sliding panel is dispensed with, and that when the device is not in use the vertical member 71 may be removed and the whole device enclosed in a compact case.

It should also be noted that, in using the calculator of Figs. 9 and 10 in bioassay work, where the cylinder 77 is not used, the latter may be inactivated by retracting the pin 66, or the cylinder itself may be removed.

EXAMPLE II—STATISTICAL ANALYSIS

In statistical analysis, the probability scale 19 is employed instead of the log scale 18, and a vertical or ordinate arithmetic scale such as 27b or any other desired scale 27c may be used, as desired. The sliding panel 14 occupies a fixed position at any desired vertical level.

The pattern of holes 45 in the template 34 may be determined by providing a probability grid (not shown), making marks on the grid corresponding to the normal distribution of sets of data having, say, from three to twenty-five members in a set, and using the marks so made as a pattern for the holes 45 in the locating member 34. Thus, as illustrated, the holes 45 aligned with the topmost groove 41 are three in number, and they are disposed at points along a line segment representing 100%, such points corresponding to approximately 16%, 50% and 84%, representing the normal distribution of the members of a set of three data. The holes aligned with the bottom groove 41 are twenty-five in number and are similarly spaced along a line segment in accordance with the normal distribution of a set of twenty-five data. The probability function used to obtain a straight line distribution, and the probability theory involved are well known and require no further elaboration here. For further details, reference may be made to Rissik, "Probability Graph Paper and Its Engineering Applications," 172, The Engineer 296-8 (1941).

The desired set of experimental data are arranged in order of increasing magnitude and are plotted with the aid of the calculator device of Figs. 1 to 6. If, for example, one hundred data are employed, the vertical scale 27b is first moved until the cursor 28 is at 0.5% on the probability scale 19, and a point is located on plotting paper 46 opposite the reading on the vertical scale 27b equal to the least value of the set of data. Then the vertical scale is moved to the position 1.5% on the probability scale and a point is plotted opposite the reading on scale 27b equal to the next higher value of the set of data, etc. In this manner a distribution plot such as shown in Fig. 8 is obtained, and the best fitting straight line L is drawn through the plotted points, as indicated. The data from which Fig. 8 is plotted are set forth in Table II below:

TABLE II

Diameter ($x$) of 100 Inhibition Zones Produced by Penicillin Solutions of Unit Concentration in the Standard Cylinder-Plate Assay

| $x$ Mm. | $x$ Mm. | $x$ Mm. | $x$ Mm. |
|---|---|---|---|
| 19.70 | 21.10 | 21.50 | 21.90 |
| 19.80 | 21.15 | 21.50 | 21.95 |
| 19.90 | 21.15 | 21.55 | 21.95 |
| 20.10 | 21.15 | 21.55 | 21.95 |
| 20.20 | 21.20 | 21.55 | 22.00 |
| 20.30 | 21.20 | 21.55 | 22.00 |
| 20.40 | 21.25 | 21.60 | 22.00 |
| 20.50 | 21.25 | 21.60 | 22.10 |
| 20.55 | 21.30 | 21.60 | 22.20 |
| 20.55 | 21.30 | 21.65 | 22.25 |
| 20.60 | 21.30 | 21.65 | 22.25 |
| 20.65 | 21.35 | 21.70 | 22.30 |
| 20.65 | 21.35 | 21.70 | 22.35 |
| 20.70 | 21.35 | 21.70 | 22.40 |
| 20.75 | 21.35 | 21.75 | 22.45 |
| 20.75 | 21.40 | 21.75 | 22.50 |
| 20.80 | 21.40 | 21.75 | 22.55 |
| 20.85 | 21.45 | 21.80 | 22.55 |
| 20.85 | 21.45 | 21.80 | 22.70 |
| 20.85 | 21.45 | 21.80 | 22.80 |
| 20.85 | 21.45 | 21.85 | 22.90 |
| 20.90 | 21.50 | 21.85 | 22.95 |
| 20.95 | 21.50 | 21.85 | 23.20 |
| 21.10 | 21.50 | 21.90 | 23.30 |
| 21.10 | 21.50 | 21.90 | 23.40 |

In connection with plotting points as just described and as illustrated in Fig. 8, use may be made of the template 34. The template 34 is shown as having a maximum of twenty-five holes 45 in a row, thus limiting its usefulness to plotting a set of twenty-five data, or, for example, every fourth value of a set of one hundred data. Obviously, however, the template may be constructed with any desired number of holes 45 in a single row.

Assuming that a set of twenty-five data are to be plotted, the template 4 will be positioned by means of the spring 36 and notches 37, so as to align the bottommost groove 41 with the pin 31. A row of twenty-five holes 45 is thus aligned with the pin 31, and these holes are normally distributed along the probability scale 19. The vertical scale 27b is moved to the right until the pin 31 drops into the first hole 45, a point is plotted opposite the corresponding value on the scale 27b, then the scale 27b is moved until the pin 31 drops into the next hole 45, another point is plotted, etc.

Obviously, an upper row of holes may be used for a lesser number of data, and, as explained, rows containing a greater number of holes may be provided for plotting greater numbers of data.

Finally, having thus plotted the data, the best fitting straight line L is drawn through the plotted points as illustrated in Fig. 8. This line is used to analyze the data to determine whether normal distribution occurs and to determine the standard deviation. Thus, the mean value is determined by setting the vertical scale 27b at 50% on the probability scale 19 and reading the corresponding value on the scale 27b. A vertical line intersecting the line L at 50% and a horizontal line b from the point of intersection may be constructed as illustrated. In the case selected, the mean value is 21.5. The values at 16% and 84%, respectively, are then similarly determined, and similar vertical lines a' and a'' and horizontal lines b' and b'' may be constructed. The ordinate readings at 16% and 84% are seen to be approximately 20.8 and 22.2, respectively. The deviations at 16% and 84% from the mean value of 21.5 are seen to be −0.7 and +0.7, or one half the difference between the 16% and 84% readings, thus indicating normal distribution of the data plotted.

In using the calculating device of Figs. 9 and 10, the scale 72, like the panel 14, is fixed at any desired vertical level. To plot, say, seven data, the cylinder 77 is rotated until the scale 90 having seven values is positioned directly under the cursor 58, as illustrated. In this position, a row containing seven holes 83 is aligned with the pin 66. If the seven data are arranged in order of increasing magnitude, the sliding scale 60 is moved to the right until the pin 66 drops into the first hole 83. A point is plotted opposite the corresponding value on scale 72. The scale 60 is moved to the left until the pin 66 drops into the next hole 83, another point is plotted, etc.

Similarly, the best fitting line may be drawn through the points thus plotted, and the calculating device may be used to analyze such line to determine the mean, the 16% and 84% values, and the standard deviation is deduced therefrom.

It will thus be seen that a graphical calculator has been provided which is of simple, inexpensive design and which is characterized by the following advantages. It provides means of rapidly plotting data on any of a large (and interchangeable) variety of scales. It also provides a means of readily analyzing a curve or line thus plotted, and of providing relative movement of the scales to conform to changing circumstances such as conforming a reference curve to standard solutions that vary from day to day. Further, the calculator provides a rapid means of statistical analysis, being useful in this respect in quickly plotting data in accordance with normal probability theory and analyzing the plotted data to determine whether normal distribution occurs and to determine the standard deviation of the data.

In its preferred form as illustrated in Figs. 9 and 10, the device is especially useful because it performs a wide variety of functions yet requires no drawing board or shiftable base, is very compact, and may be packaged in a small case. Also, a variety of permanent scales 72 may be embodied in as many vertical members 71, each scale being permanently imprinted upon a separate vertical member 71, and any selected scale 72 may be used when needed by attachment to the bracket 70 as illustrated.

While we have shown the preferred forms of our invention, it is to be understood that various changes may be made in its construction by those skilled in the art without departing from the spirit of the invention as defined in the appended claims.

Having thus described our invention, what we claim and desire to secure by Letters Patent is:

1. A calculating device comprising a frame having a groove formed therein, a sliding scale slidable in said groove, said frame having a parallel scale formed thereon, a vertical scale affixed to said sliding scale and slidable therewith, a pin affixed to said sliding scale and yieldably urged in one direction, and a locating member disposed opposite and adjacent to said pin, said locating member having a plurality of holes formed therein and distributed in accordance with a predetermined pattern, said pin seating in said holes in sequence as said sliding scale is moved so as to locate said vertical scale at a succession of positions corresponding to said pattern.

2. A calculating device comprising a frame, a slide member having a scale affixed thereto, a parallel fixed scale, a cursor affixed to said slide member and adapted to scan said fixed scale, a vertical scale affixed to said slide member, a locating member movable relatively to said frame, and yieldable means interconnecting said locating member and slide member, said locating member having formed thereon a plurality of sets of locating means, each set being distributed in accordance with a predetermined pattern, said locating member being movable so as to bring any selected set into operative position whereby, when said slide member is moved, said vertical scale is successively located at a plurality of positions corresponding to the pattern of distribution of the selected set of locating means.

3. A calculating device comprising a frame, a slide rule including a fixed scale and a sliding scale, a cursor affixed to said sliding scale and adapted to scan said fixed scale, a vertical scale affixed to but detachable from said sliding scale, a rotary member affixed to said frame and having formed on its surface a plurality of circumferentially spaced, parallel rows of holes, the holes of each row being distributed in accordance with a predetermined pattern differing from the pattern of other rows of holes, and yieldable means interconnecting said sliding scale with any selected row of holes.

4. A calculating device comprising a frame, a slide rule including a fixed scale and a sliding scale, a vertical scale affixed to said sliding scale but detachable therefrom and movable vertically relatively to said sliding scale, and a rotary locating member rotatable in said frame, said rotary locating member having formed on its surface a plurality of circumferentially spaced, parallel rows of holes, the holes of each row having normal distribution and differing in number from other rows, and yieldable means interconnecting said slide member with any selected row of holes so as to locate said vertical scale in a succession of positions corresponding to the distribution of holes of the selected row.

5. A calculating device comprising a frame, a slide rule including a sliding scale having a cursor affixed thereto and a parallel normal distribution scale scanned by said cursor, a vertical scale affixed to said sliding scale, detachable therefrom and movable vertically relatively to said sliding scale, means for attaching and firmly holding a sheet of paper beneath and adjacent said vertical scale, a cylindrical locating member rotatably supported parallel to said slide rule, and a pin supported by said slide member and resiliently urged into engagement with said locating member, said locating member having a plurality of circumferentially spaced grooves formed therein parallel to said slide rule, and a set of holes formed in each groove and spaced in accordance with normal distribution, each said set differing from other sets of holes.

FRANK M. GOYAN.
JEAN DUFRENOY.

REFERENCES CITED

The following references are of record in the file of this patent:

UNITED STATES PATENTS

| Number | Name | Date |
| --- | --- | --- |
| 460,930 | Cox | Oct. 6, 1891 |
| 655,027 | Smith | July 31, 1900 |
| 1,461,975 | Eaton et al. | July 17, 1923 |
| 1,965,062 | Wellington | July 3, 1934 |

FOREIGN PATENTS

| Number | Country | Date |
| --- | --- | --- |
| 452,600 | France | Mar. 10, 1913 |

OTHER REFERENCES

"Instruments of Calculation" by E. M. Horsbrugh, published by G. Bell & Sons, London in 1914, page 269.

"Special Slide Rules" by J. N. Arnold, published by Purdue University in 1933. This comprises extension series No. 32 of the Engineering Extension Dept. of Purdue University. Pages 22–26.